United States Patent [19]

Ikemachi et al.

[11] Patent Number: 5,244,872
[45] Date of Patent: Sep. 14, 1993

[54] METHOD OF PREPARING PB-SR-CA-LN-CA-O METAL OXIDE SUPERCONDUCTOR

[75] Inventors: Takaaki Ikemachi, Urayasu; Takashi Kawano, Tokyo; Shin-ichi Koriyama, Urayasu; Hisao Yamauchi, Nagareyama, all of Japan

[73] Assignees: International Superconductivity Technology Center; Sanyo Electric Co., Ltd.; Kyocera Corporation; Tokyo Gas Co., Ltd., all of Japan

[21] Appl. No.: 785,326

[22] Filed: Nov. 1, 1991

[30] Foreign Application Priority Data

Nov. 27, 1990 [JP] Japan .................. 2-324593

[51] Int. Cl.$^5$ .............. C01B 13/36; C01F 11/02; C01G 3/02; C01G 21/02
[52] U.S. Cl. ........................ 505/1; 423/592; 423/604; 505/725; 505/738
[58] Field of Search .......... 505/1, 738, 725, 775, 505/776, 777, 778, 779; 423/592, 604

[56] References Cited

U.S. PATENT DOCUMENTS

| | | | |
|---|---|---|---|
| 4,898,851 | 2/1990 | Michel | 505/1 |
| 4,962,082 | 10/1990 | Barboux | 505/1 |
| 5,011,822 | 4/1991 | Barder | 505/738 |
| 5,077,265 | 12/1991 | Ritter | 505/1 |

OTHER PUBLICATIONS

Zandbergen "Electron Microscopy in $Pb_2Sr_2Ca_{0.5}Y_{0.5}Cu_3O_x$" Physica C v. 158 Apr. 1989 pp. 155–172.
Subramanian "Superconductivity Near Liquid Nitrogen ... in PbSrRCaCuO ..." Physica C v. 157, Jun. 1, 1989 pp. 124–130.
Itoh "An Improved Coprecipitation Method for ... BiPbSrCaCuO ..." Chem. Lett. v. 3 1990 pp. 429–432.
Cava et al. "Superconductivity near 70K in a new family of layered copper oxides" Nature v. 336 Nov. 17, 1988 pp. 211–214.
White et al. "Preparation and Microstructural Investigation of the High-Tc Superconductor $Pb_2Sr_2Y_{0.5}Ca_{0.5}Cu_3O_8$" Aust. J. Phys. v. 42, 1989, pp. 551–563.
Tokiwa et al. "Synthesis and crystal structure of $Pb_2Sr_2(Ln,Ce)_nCu_3O_{6+2n+\delta}$ and $Pb(Ba,Sr)_2(Ln,Ce)_n Cu_3O_{5+2n+\delta}(Ln=Y, n=3, 4 \ldots$ and $0 \leq \delta \leq 2.0)$, layered structure compounds with multiple fluorite layers", Physica C v. 181 Oct. 10, 1991, pp. 311–319.

Primary Examiner—Paul Lieberman
Assistant Examiner—John Boyd
Attorney, Agent, or Firm—Lorusso & Loud

[57] ABSTRACT

An oxide superconductor having the following formula:

$$Pb_2Sr_2Ca_{1-p}Ln_pCu_3O_q \text{ or}$$

$$Pb_{1-x}Cu_xSr_2Ca_{1-y}Ln_yCu_2O_z$$

wherein Ln represents a rare earth element, p is 0.3–0.7, q is 7.8–8.2, x is 0.2–0.5, y is 0.3–0.7 and z is 6.8–7.2 is prepared using a coprecipitation method. An acetic acid solution of carbonates, acetates or nitrates of Pb, Sr, Ca, Cu and Ln is mixed with an aqueous solution of oxalic or tartaric acid, or a lower alkyl ester thereof. The mixture is reacted to precipitate the Pb, Sr, Ca, Cu and Ln as oxalates or tartarates and the precipitates are dried and sintered to obtain the oxide superconductor.

15 Claims, 2 Drawing Sheets

METHOD OF PREPARING PB-SR-CA-LN-CA-O METAL OXIDE SUPERCONDUCTOR

BACKGROUND OF THE INVENTION

This invention relates to a method of the production of a Pb-containing, copper oxide-type superconductor.

Known Pb-containing, copper oxide-type superconductors include, for example, $Pb_2Sr_2Ca_{1-x}Y_xCu_3O_y$ (generally called 2213-phase superconductor), $Pb_{1-x}Cu_xSr_2Ca_{1-y}Y_yCu_2O_z$ (1212-phase), $(Pb,Bi)_2(Sr_{1-x}La_x)_2CuO_y$ (2201-phase superconductor) and $(Pb_{1-x}Cu_x)(Sr_{1-y}La_y)_2CuO_z$ (1201-phase superconductor). These superconductors have been hitherto produced by a method including a solid-phase reaction in which a blend of solid raw materials is sintered at a high temperature.

The solid phase reaction method, however, has the following problems:

(1) Extensive pulverization is required in order to obtain a homogeneous blend of solid raw materials. This is disadvantageous from economic point of view.

(2) A high sintering temperature is required. This is disadvantageous from economic point of view. Further, when the superconductor is formed into a composite body, a high sintering temperature will cause interfacial reaction between the oxide superconductor layer and a substrate, such as a coil or a wire, on which the layer is to be supported. Additionally, the kind of the substrate to be used should be limited to one which can withstand the high sintering temperature.

(3) The superconductor has a crystal size of as high as several tens micron meters, so that a dense, homogeneous superconductor having an improved critical current density Jc cannot be obtained.

SUMMARY OF THE INVENTION

It is, therefore, a prime object of the present invention to provide a method by which a superconductor having a high critical temperature claim Tc and a high critical current density Jc can be obtained.

Another object of the present invention is to provide a method in which sintering can be effected at relatively a low temperature.

It is a further object of the present invention to provide a method which does not require a pulverization step and which is low in energy consumption.

In accomplishing the foregoing objects, there is provided in accordance with the present invention a method of producing a superconductor of metal oxides having the following formula:

$$Pb_2Sr_2Ca_{1-p}Ln_pCu_3O_q$$

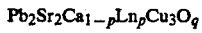

wherein Ln represents Y or a lanthanoid, p is a number of between 0.3 and 0.7 and q is a number between 7.8 and 8.2, the method including the steps of:

providing an acetic acid solution of carbonates, acetates or nitrates of Pb, Sr, Ca, Cu and Ln;

providing an aqueous solution of a dicarboxylic acid or a lower alkyl ester thereof, the dicarboxylic acid being selected from the group consisting of oxalic acid and tartaric acid;

mixing the aqueous solution with the acetic acid solution to obtain a mixture;

reacting the mixture to precipitate the Pb, Sr, Ca, Cu and Ln as dicarboxylates thereof; and sintering the dicarboxylates at a temperature of 700°–850° C. in an oxygen-containing atmosphere having a partial oxygen pressure of 0.0001–0.1 atm to obtain the metal oxides.

The present invention also provides a method of producing a superconductor of metal oxides having the following formula:

$$Pb_{1-x}Cu_xSr_2Ca_{1-y}Ln_yCu_2O_z$$

wherein Ln represents a rare earth element, x is a number of between 0.2 and 0.5 and y is a number between 0.3 and 0.7 and z is a number between 6.8 and 7.2, the method comprising the steps of:

providing an acetic acid solution of acetates or nitrates of Pb, Sr, Ca, Cu and Ln;

providing an aqueous solution of a dicarboxylic acid or a lower alkyl ester thereof, the dicarboxylic acid being selected from the group consisting of oxalic acid and tartaric acid;

mixing the aqueous solution with the acetic acid solution to obtain a mixture;

reacting the mixture to precipitate the Pb, Sr, Ca, Cu and Ln as dicarboxylates thereof; and sintering the dicarboxylates at a temperature of 900°–930° C. in an oxygen-containing atmosphere to convert the dicarboxylates into the metal oxides.

BRIEF DESCRIPTION OF THE DRAWINGS

Other objects, features and advantages of the present invention will become apparent from the detailed description of the invention which follows, when considered in the light of the accompanying drawings, in which.

DETAILED DESCRIPTION OF THE PREFERRED EMBODIMENTS OF THE INVENTION

Figure 1:
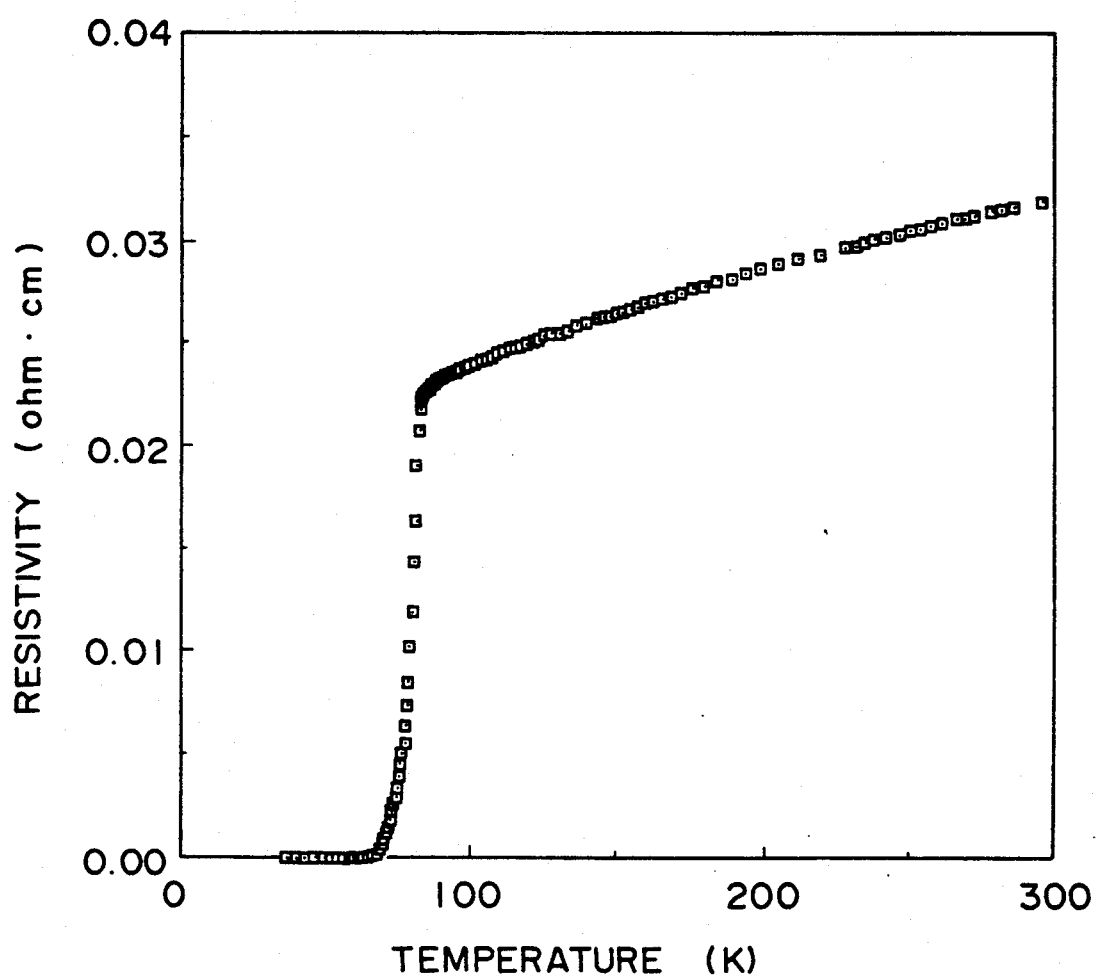
FIGS. 1 and 2 are graphs showing temperature dependency of resistivity in the superconductors obtained in Examples 1 and 2, respectively.
Figure 2:
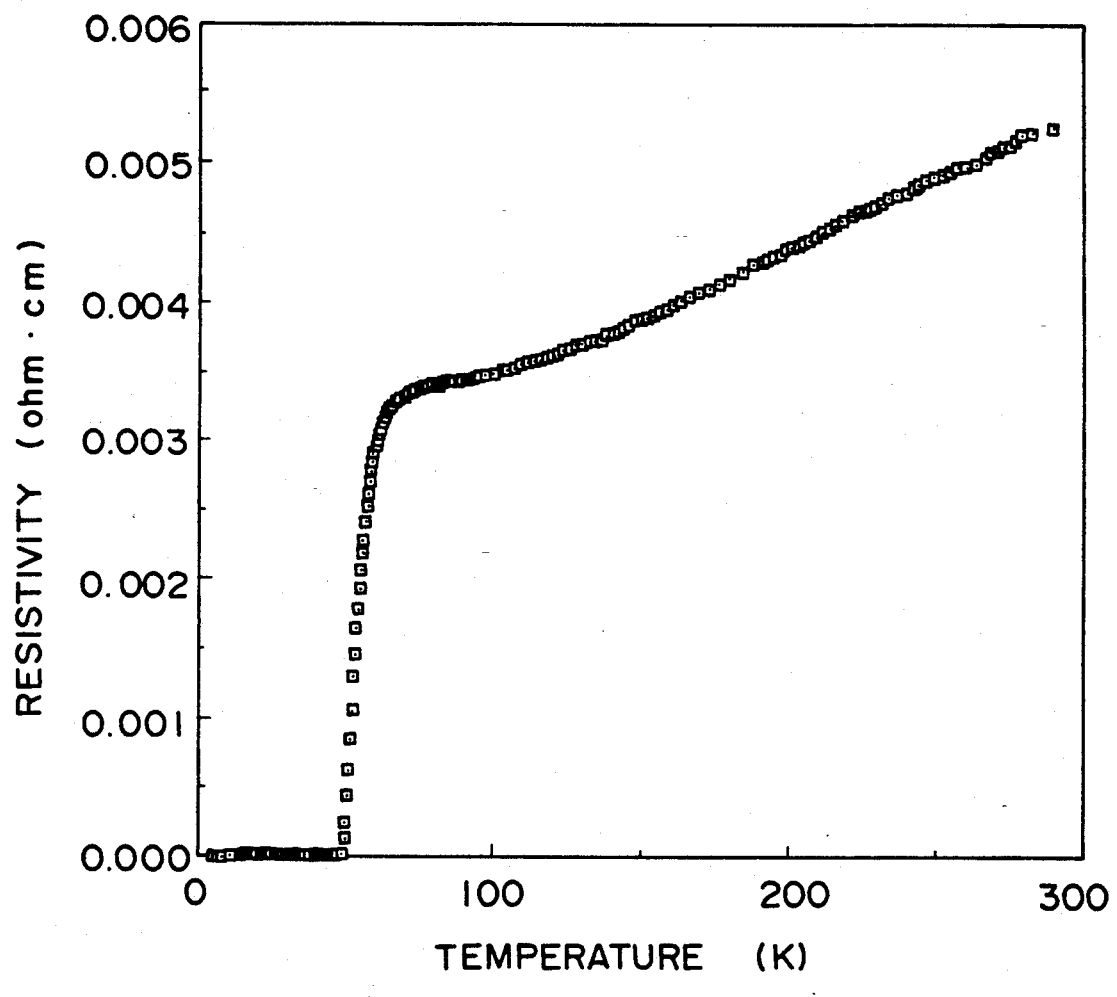

In the method according to the present invention, an acetic acid solution of salts of Pb, Sr, Ca, Cu and Ln is first prepared. The metal salts are carbonates, nitrates or acetates. The proportion of the metal salts in the acetic acid solution is determined in conformity with the composition of respective metals in the desired oxide superconductor having the following formula (I) or (II)

$$Pb_2Sr_2Ca_{1-p}Ln_pCu_3O_q \qquad (I)$$

$$Pb_{1-x}Cu_xSr_2Ca_{1-y}Ln_yCu_2O_z \qquad (II)$$

wherein Ln represents a rare earth element, p is 0.3–0.7, q is 7.8–8.2, x is 0.2–0.5, y is 0.3–0.7 and z is 6.8–7.2. The total concentration of the metal salts in the acetic acid solution is generally 1–10% by weight, preferably 4–6% by weight. The acetic acid solution may be prepared by dissolving predetermined quantities of the metal salts in acetic acid, generally aqueous acetic acid having acetic acid concentration of 20–60% by weight, preferably 30–50% by weight.

The acetic acid solution containing carbonates, nitrates or acetates of Pb, Sr, Ca, Cu and Ln is mixed with an aqueous solution of a dicarboxylic acid or a water soluble, lower alkyl diester thereof. The dicarboxylic acid is oxalic acid or tartaric acid. The term "lower alkyl" used in the present specification is intended to refer to an alkyl group having 1-8 carbon atoms. Examples of suitable diesters include dimethyl oxalate, diethyl oxalate, dimethyl tartarate and diethyl tartarate.

The concentration of the dicarboxylic acid or its dialkyl ester in the aqueous solution is generally 3-15% by weight, preferably 8-12% by weight. The mixing ratio of the acetic acid solution to the aqueous solution is such that the dicarboxylic acid or its dialkyl ester is present in the resulting mixture in an amount of 1.5 equivalent per equivalent of the total of the Pb, Sr, Ca, Cu and Ln salts.

The mixture is then reacted to precipitate the Pb, Sr, Ca, Cu and Ln as oxalates or tartarates. The reaction is generally performed at a temperature of 10°-80° C., for 10-200 hours with stirring. In the case of the reaction of a metal acetate with dialkyl oxalate, for example, the reaction is as follows:

$$M(CH_3COO)_n + n/2(COOR)_2 = M(C_2O_4)_{n/2} + nCH_3COOR$$

wherein M stands for Pb, Sr, Ca, Cu or Ln, n is the valency of M and R is a lower alkyl.

The resulting reaction mixture is then filtered to separate the precipitates. The precipitates are washed with water and dried. The dried precipitates are then sintered to obtain the desired superconductor.

In the case of the superconductor of the formula (I), the sintering is performed at a temperature of 700°-850° C., preferably 800°-830° C. in an oxygen-containing atmosphere having a partial oxygen pressure of 0.0001-0.1 atm, preferably in the atmosphere of argon having an oxygen partial pressure of 0.0001-0.1 atm. In the case of the superconductor of the formula (II), the sintering is carried out at a temperature of 870°-1030° C., preferably 870°-930° C. in an oxygen-containing atmosphere.

The following examples will further illustrate the present invention.

EXAMPLE 1

Preparation of $Pb_2Sr_2Ca_{1-p}Ln_pCu_3O_q$ 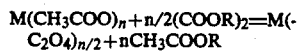

Anhydrous lead acetate (20 mmol), strontium acetate hexahydrate (20 mmol), anhydrous calcium acetate (5 mmol), anhydrous yttrium acetate (5 mmol) and cupric acetate monohydrate (30 mmol) were dissolved in 360 ml of 40% acetic acid. The acetic acid solution was mixed with 125 ml of an aqueous solution containing 125 mmol of dimethyl oxalate. The mixture was then stirred at room temperature for 1 week. The reaction mixture was filtered to separate the precipitates formed as a result of the reaction and the precipitates were washed with water and dried at 100°-120° C. for 10 hours. The dried mixture was then heated at 500° C. for 10 hours in vacuo to decompose the oxalates. The heat treated mixture was press-molded at a pressure of 1-2 ton/cm² and the molding was sintered at 700°-850° C. for about 1 hour in an atmosphere of argon having an oxygen partial pressure of 0.0001 atm, followed by annealing at 350° C. for about 20 hours, thereby obtaining a superconductor of 2213 phase. The superconductor shows the temperature dependency of the resistivity shown in FIG. 1 from which Tc is determined as being 83 K.

EXAMPLE 2

Preparation of $Pb_{1-x}Cu_xSr_2Ca_{1-y}Ln_yCu_2O_z$

Anhydrous lead acetate (6.5 mmol), strontium acetate hexahydrate (20 mmol), anhydrous calcium acetate (5 mmol), anhydrous yttrium acetate (5 mmol) and cupric acetate monohydrate (23.5 mmol) were dissolved in 275 ml of 40% acetic acid. The acetic acid solution was mixed with 95 ml of an aqueous solution containing 95 mmol of dimethyl oxalate. The mixture was then stirred at room temperature for 1 week. The reaction mixture was filtered to separate the precipitates formed as a result of the reaction and the precipitates were washed with water and dried at 100°-120° C. for 10 hours. The dried mixture was then heated at 500° C. for 10 hours in vacuo to decompose the oxalates. The heat treated mixture was press-molded at a pressure of 1-2 ton/cm² and the molding was sintered at 910°-930° C. for about 1 hour in an atmosphere of oxygen, followed by quenching by immersion into liquid nitrogen, thereby obtaining a superconductor of 1212 phase. The temperature dependency of the resistivity of the superconductor is shown in FIG. 1 from which Tc is determined as being 63 K.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing a superconductor of metal oxides having the following formula:

$$Pb_2Sr_2Ca_{1-p}Ln_pCu_3O_q$$ 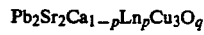

wherein Ln represents Y or a lanthanoid, p is a number of between 0.3 and 0.7 and q is a number between 7.8 and 8.2, said method comprising the steps of:
providing a single acetic acid solution of carbonates, acetates of nitrates of Pb, Sr, Ca, Cu and Ln;
providing an aqueous solution of a dicarboxylic acid or a lower alkyl ester thereof, said dicarboxylic acid being selected from the group consisting of oxalic acid and tartaric acid;
mixing said aqueous solution with said acetic acid solution to obtain a mixture;
reacting said mixture to precipitate the Pb, Sr, Ca, Cu and Ln as dicarboxylates thereof;
sintering said dicarboxylates at a temperature of 700°-850° C. in an oxygen-containing atmosphere having a partial oxygen pressure of 0.0001-0.1 atm to obtain a sintered product; and
annealing said sintered product to obtain said metal oxides.

2. A method as claimed in claim 1, wherein said lower alkyl is methyl or ethyl.

3. A method of producing a superconductor of metal oxides having the following formula:

$$Pb_{1-x}Cu_xCa_{1-y}Ln_yCu_2O_z$$ 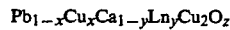

wherein Ln represents a rare earth element, x is a number of between 0.2 and 0.5 and y is a number between 0.3 and 0.7 and z is a number between 6.8 and 7.2, said method comprising the steps of:
- providing a single acetic acid solution of acetates or nitrates of Pb, Sr, Ca, Cu and Ln;
- providing an aqueous solution of a dicarboxylic acid or a lower alkyl ester thereof, said dicarboxylic acid being selected from the group consisting of oxalic acid and tartaric acid;
- mixing said aqueous solution with said acetic acid solution to obtain a mixture;
- reacting said mixture to precipitate the Pb, Sr, Ca, Cu and Ln as dicarboxylates thereof;
- sintering said dicarboxylates at a temperature of 870°–1030° C. in an oxygen-containing atmosphere to obtain a sintered product; and
- quenching said sintered product to obtain said superconductor of metal oxides.

4. A method as claimed in claim 3, wherein said lower alkyl is methyl or ethyl.

5. A method as claimed in claim 1, wherein said carbonates, acetates or nitrates of Pb, Sr, Ca, Cu and Ln are present in said acetic acid solution in an amount of 1–10% by weight.

6. A method as claimed in claim 1, wherein said acetic acid solution is an aqueous acetic acid solution having an acetic acid concentration of 20–60% by weight.

7. A method as claimed in claim 1, wherein, before said sintering step, said dicarboxylates are heated in vacuum.

8. A method as claimed in claim 1, wherein said aqueous solution has a concentration of said dicarboxylic acid or dialkyl ester thereof of 3–15% by weight.

9. A method as claimed in claim 1, wherein said sintering step is performed at a temperature of 800°–830° C.

10. A method as claimed in claim 3, wherein said quenching is by immersing said sintered product into liquid nitrogen.

11. A method as claimed in claim 3, wherein said carbonates, acetates or nitrates of Pb, Sr, Ca, Cu and Ln are present in said acetic acid solution in an amount of 1–10% by weight.

12. A method as claimed in claim 3, wherein said acetic acid solution is an aqueous acetic acid solution having an acetic acid concentration of 20–60% by weight.

13. A method as claimed in claim 3, wherein, before said sintering step, said dicarboxylates are heated in vacuum.

14. A method as claimed in claim 3, wherein said aqueous solution has a concentration of said dicarboxylic acid or dialkyl ester thereof of 3–15% by weight.

15. A method as claimed in claim 3, wherein said sintering step is performed at a temperature of 870°–930° C.

* * * * *